United States Patent [19]

Hilton

[11] 3,978,259

[45] Aug. 31, 1976

[54] PROCESS FOR INCREASING THE COEFFICIENT OF FRICTION OF TEXTILE YARN OR CLOTH

[75] Inventor: William James Hilton, Ashby de la Zouche, England

[73] Assignee: Bonas Brothers Limited, Great Britain

[22] Filed: Oct. 2, 1974

[21] Appl. No.: 511,369

Related U.S. Application Data

[63] Continuation-in-part of Ser. No. 302,246, Oct. 30, 1972, abandoned.

[30] Foreign Application Priority Data

Apr. 22, 1972 United Kingdom............... 18781/72
Dec. 4, 1971 United Kingdom............... 56408/71

[52] U.S. Cl.................................... 428/195; 2/76; 2/221; 2/237; 427/286; 427/288; 427/387; 427/390; 427/421; 428/266; 428/447

[51] Int. Cl.² ....................... A41F 9/00; B05C 3/20

[58] Field of Search ...................... 117/104, 132 BS; 427/387, 390, 286, 288, 421; 428/266, 195, 447; 2/76, 221, 237; 118/300

[56] References Cited

UNITED STATES PATENTS

| | | | |
|---|---|---|---|
| 3,377,987 | 4/1968 | Juvinall et al.................. | 118/300 X |
| 3,628,985 | 12/1971 | Hider et al. .................. | 117/132 BS |
| 3,632,423 | 1/1972 | Kusuhara ........................... | 427/387 |
| 3,706,591 | 12/1972 | Nitzsche et al. .................... | 427/387 |
| 3,816,164 | 6/1974 | Pepe et al. ..................... | 117/132 BS |
| 3,854,978 | 12/1974 | Campbell et al................ | 427/387 X |

*Primary Examiner*—Ralph Husack
*Attorney, Agent, or Firm*—James E. Nilles

[57] ABSTRACT

Textile fabric, a part of which has its coefficient of friction increased by application to said part of an inert, non-slump, room temperature vulcanizing silicone rubber, which rubber is thereafter vulcanized.

10 Claims, 5 Drawing Figures

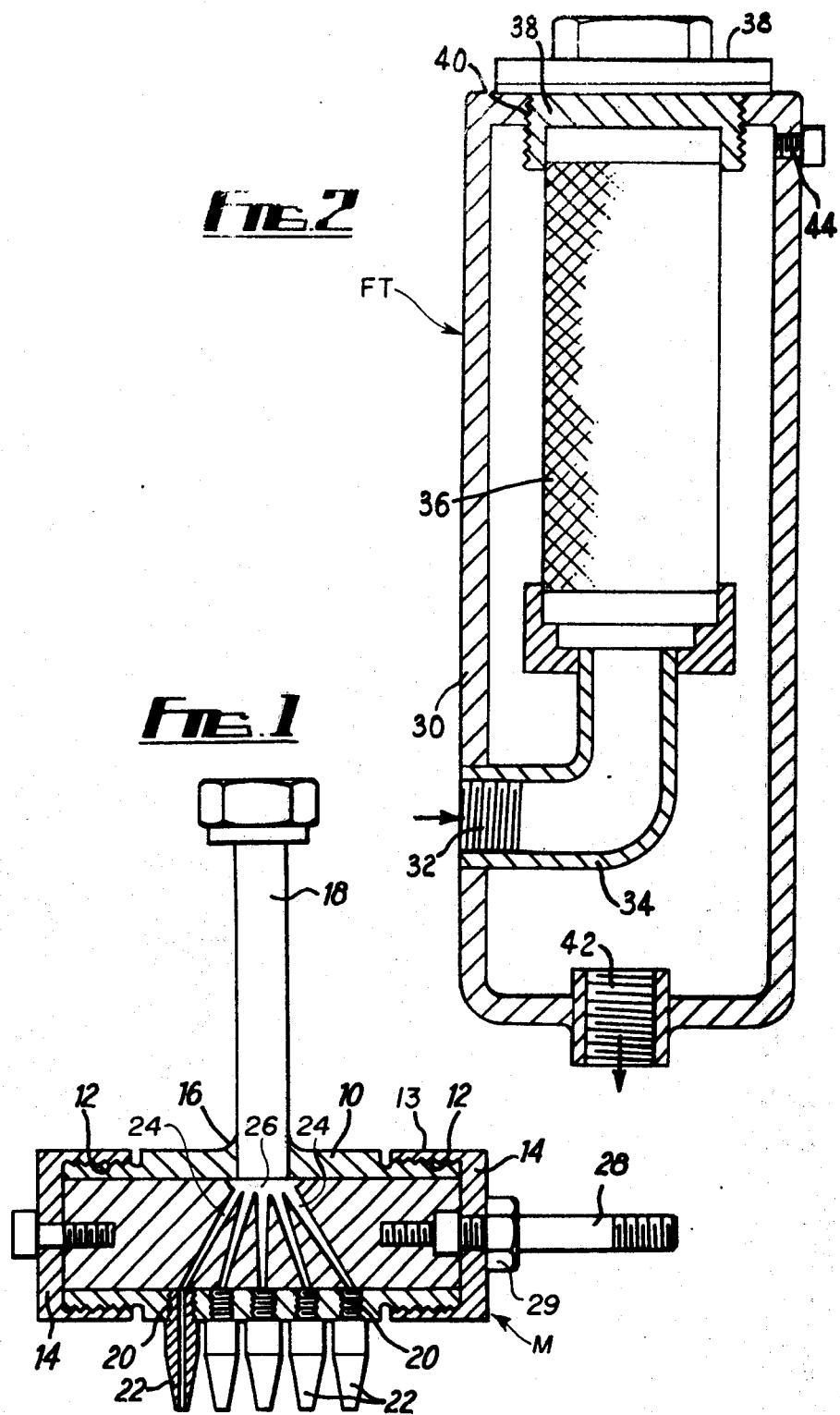

PROCESS FOR INCREASING THE COEFFICIENT OF FRICTION OF TEXTILE YARN OR CLOTH

This is a continuation-in-part of application Ser. No. 302,246 filed Oct. 30, 1972 now abandoned.

BACKGROUND OF THE INVENTION

This invention relates to a process for increasing the coefficient of friction of textile fabrics and to products produced by the said process.

As is known in the art, it is desirable for parts of certain garments to have a relatively high coefficient of friction, for example the waistbands of trousers and elasticated corsetry.

These parts are usually processed narrow fabrics and are generally known as textile grippers. The grippers ensure that the garment will not move readily relative to the surface therebeneath which may be another garment or a persons skin.

Generally, the coefficient of friction is increased by coating the fabric with a material of relatively high coefficient of friction. However, such a coating must adhere perfectly to the fabric in question. It must be medically safe, inert to perspiration and have the ability to accommodate distortions and movements of the garment to which it is attached, without cracking and/or separating therefrom. In addition, it must retain these characteristics after repeated washing or dry cleaning.

There have bee many publications of prior art techniques for producing grippers. The formulations used for increasing the coefficient of friction include organic rubbers and then various derived compounds, either synthetic or natural. Silicone rubbers of the polydimethyl siloxane type in which benzoyl peroxide is the curing agent and reacts to form methyl side groups have also been used.

All these types of grippers require temperatures to be elevated above 71°C to bring about the required cure.

To obtain the required gripping action either the whole face of a fabric or a substantial part of said face had to be processed, thereby yielding a composite fabric. Application techniques include spreading, dipping, spraying, calendering and kiss roll in normal atmospheric conditions, curing being achieved by heated chambers or ovens.

Grippers produced by these methods have some or all of the following disadvantages.

1. High modulus to obtain required force in normal direction to obtain sufficient grip. This means that the garment is restrictive.
2. Adhesion of rubber to fabric is obtained by impregnation of base fabric and the weave must give a key to the rubber. This process disfigures the face of lace and therefore cannot be used on corsetry.
3. These types of rubbers will not withstand dry cleaning with tetrachlorethylene or perchlorethylene.
4. Pin holes are a constant problem as the release of gases are an inherent part of the curing process.
5. These types of rubbers are not medically inert and cannot be worn next to the skin.
6. As previously stated to obtain sufficient grip large areas have to be coated so that the resultant product is heavy and cumbersome.

SUMMARY OF THE INVENTION

According to the present invention there is provided a process for increasing the coefficient of friction of textile fabrics, the process comprising spraying or extruding at least part of said fabric with an inert room temperature vulcanising silicone rubber. The rubber is of a type having hydroxy groups as well as the normal methyl side groups.

BRIEF DESCRIPTION OF THE DRAWINGS

FIG. 1 shows a jet manifold, partly in section

FIG. 2 is a part section through a combined filter and air trap

DESCRIPTION OF THE INVENTION

Room temperature vulcanising silicone rubbers (hereinafter referred to as RTV silicone rubbers) are normally marketed as Adhesive/Sealants and have unusual properties. These include:

1. Elongation around 400 percent.
2. Resistance to all known solvents.
3. A very high coefficient of friction.
4. They are inert and do not cause skin irritation.
5. They will bond to a wide range of materials.
6. They are translucent.

These properties are unique and ideal for a textile gripper.

It is now preferred that RTV silicone rubbers of the General Electric type RTV 118 be used.

The physical characteristics required of the rubber are that it should be non-slump so that it will hold a uniform shaped bead in the position where it is extruded onto the fabric. It must also have a low surface tension so that it will "wet" out the fabric, to achieve the required adhesion. In addition the flow characteristics or viscosity must be such that it can be extruded at reasonable pressures, and must not bleed through to the face of the fabric. General Electric RTV 118 has these properties.

It has been found that to ensure perfect adhesion the fabric should have its moisture content reduced to a very low figure. This can be achieved by storing the fabric in a drying room at a temperature of 50°C for at least 3 days, prior to coating with the RTV silicon rubber.

In the case of stretch fabrics it has been found that the cured RTV silicone rubber must have an elongation of at least three times the elongation of the fabric itself.

Thus, for an elastic which has an elongation of 145 percent the coating must be capable of at least 430 percent elongation.

Figure 4:
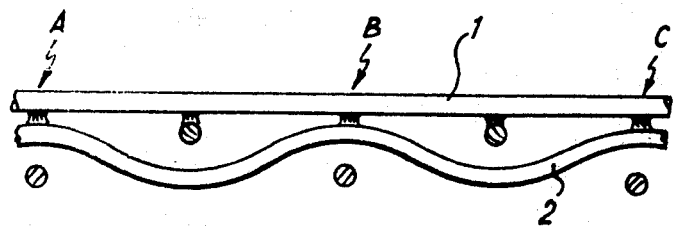
FIG. 4 is a diagrammatic warpwise section through a stretchable fabric in the relaxed state.
Figure 5:
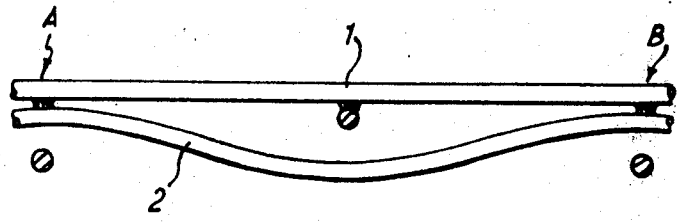
FIG. 5 shows the fabric of FIG. 4 in the stretched condition.

Referring to FIG. 4, an elasticated fabric having a line of RTV silicone rubber bead 1 applied thereto is shown in warpwise section and in the relaxed state. It will be seen that the rubber is bonded to the warp 2 at spaced apart points A, B and C. If the fabric is now stretched by 100 percent in the warpwise direction as shown in FIG. 5, it will be seen that there can be no movement of the rubber relative to the warp at those points where the rubber is bonded to the warp. Thus the extension must therefore be accommodated by the portion of the rubber bead 1 between the points where the bead is bonded to the fabric. Thus when the fabric is stretched as shown in FIG. 5 the rubber bead between the points A and B must stretch more than the 100 percent by which the fabric is stretched. In fact it has been foumd that the rubber must stretch by upwards of 200 percent and preferably at least 300 percent.

In one embodiment of the invention the fabric which is to be treated is led below one or more nozzles adjusted to deliver polymer at the rate of 8oz of rubber per gross in the case of trouser waistband and from 12oz to 60oz of polymer per gross in the case of an elasticated garment such as a corset. After passing from the nozzles the polymer is allowed to cure at ambient temperature.

Extruding RTV Silicone Rubber

The polymer cures on exposure to moisture at ambient temperature. It therefore follows that all application equipment must be designed to function under rigid anhydrous conditions.

The polymer is, as aforesaid, preferably extruded onto the material to be coated through one or more jets. Advantageously, the polymer is led to the or each jet through a filter to remove lumps of cured or partly cured silicone rubber, the filter also incorporating an air trap where gases forming in the polymer are collected. It is of course essential to remove gas bubbles from the polymer since the flow of polymer through a fine jet will be interrupted by the presence of a gaseous bubble. It is also desirable that the filter is adjacent to the jet as the shearing action which occurs when the polymer passes through the filter considerably improves the flow characteristics of the polymer through the jets.

Equipment Required To Produce The Invention

Referring in greater detail to the drawings, FIG. 1 shows a jet manifold M for spraying a mixture of high and low elongation silicone rubber comprising a hollow, open ended housing 10 which is provided with external threads 12 at each end thereof. A solid insert 13 is sized to be receivable in said housing and held therein by internally threaded end caps 14 engaged upon the threaded ends of the housing. The housing includes an inlet port 16 to which a mixture delivery pipe 18 is secured, and also includes a plurality of internally threaded outlet ports 20 on the side of the housing opposite port 16. Jets 22 of selected orifice size are engaged in the ports 20.

The inlet port and outlet ports are interconnected by means of a plurality of passageways 24 extending through said insert 13. The passageways lead from a recess 26 in the edge of the insert located in alignment with port 16 to define a chamber from which said passageways 24 radiate towards the other side of said insert 13. As shown in FIG. 1, the cross-sectional area of the passageways 24 decrease as they extend towards the outlet ports 20.

The relative position of the insert 13 and housing 10 can be adjusted with fine control and locked in the correct position by means of screws 28 and lock nuts 29, which screws extend through the end faces of the end caps 14 and threadably engage said insert.

In order to clean the manifold M, the end caps 14 are removed and the insert 13 then withdrawn from the housing 10 to permit the passageways to be cleaned with a tapered reamer (not shown).

The particular nozzle assembly shown is easily disconnected and cleaned which is particularly important when handling silicone rubber.

As stated previously, the removal of air bubbles from the mixture is important for trouble-free operation of the jets 22. Hence, the silicone rubber mixture is led to the manifold delivery pipe 18 through a filter and air trap FT for example of the kind shown in FIG. 2.

Referring to FIG. 2, the filter and air trap comprise a hollow chamber 30 having an inlet port 32 in the lower portion thereof to which the silicone mixture is delivered. A pipe 34 leads from the inlet port 32 to the bottom of a screen filter 36 which is disposed substantially concentrically in said chamber. The top of the filter FT is secured to a cap 38 which is threadedly engaged in an aperture 40 in the top of the chamber.

A mixture outlet port 42 is provided adjacent the bottom of the chamber and accumulating gases from the silicone mixture are vented from time to time through port 44 at the top of the chamber 30.

By arranging the screen filter 36 near the top of the chamber and the outlet 42 near the bottom of the chamber, maximum opportunity is given for gas bubbles to rise to the top of the chamber and hence the minimum amount of air is entrapped in the mixture.

Figure 3:
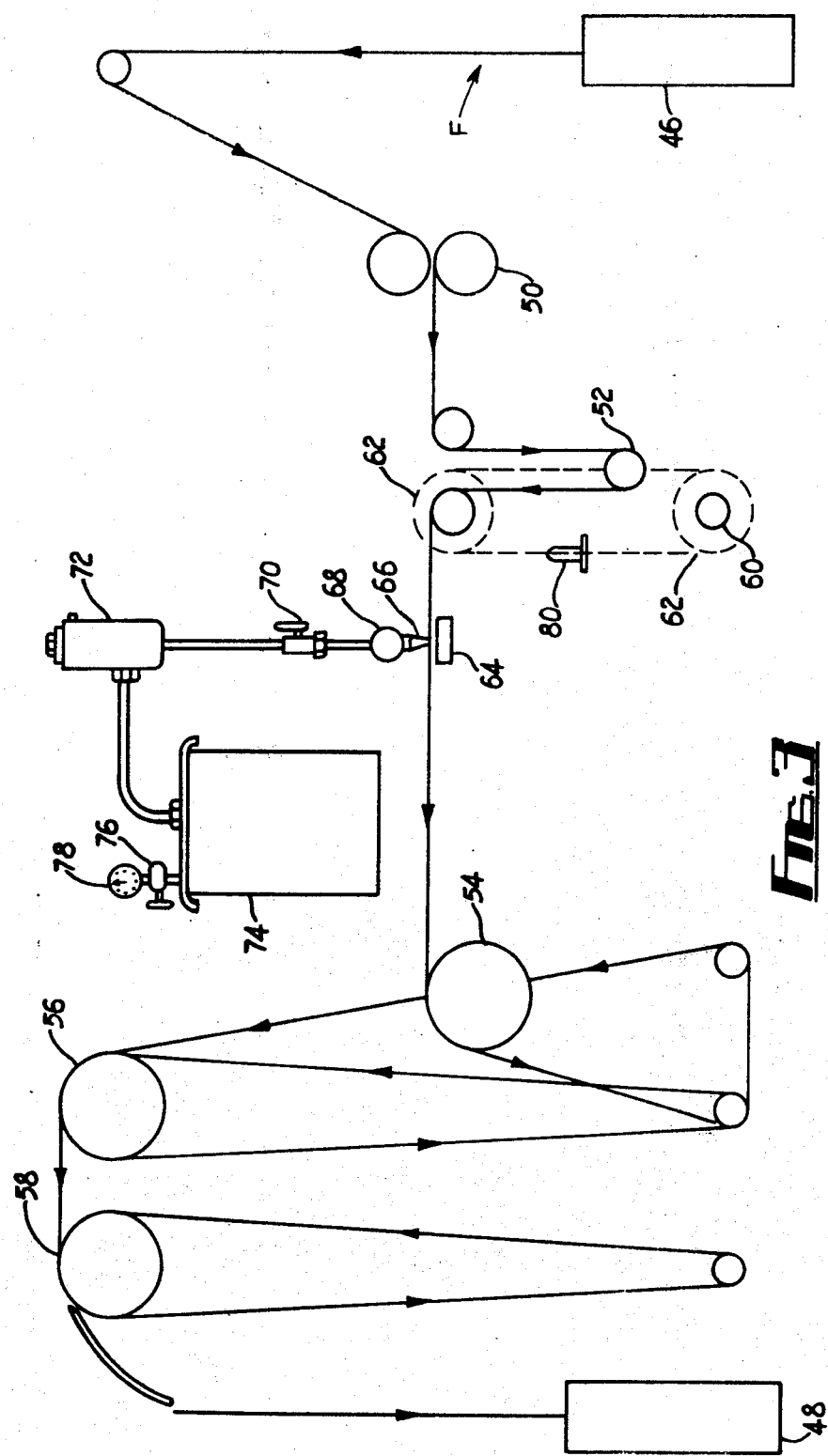
FIG. 3 is a diagrammatic view of an apparatus for carrying out the present invention

In FIG. 3 the basic design of the machine used to form the extrusion is shown.

The narrow fabric F is taken from bin 46 along the path as indicated by the arrows, and ultimately to bin 48. Take off roller 54 is directly coupled to the first stage magazine roller 56 and a second stage roller 58. The take off and magazine are driven by a constant speed motor (not shown).

The silicone rubber requires about twenty minutes to cure tack-free at 60 percent relative humidity, and the magazine stores sufficient fabric to achieve this result.

Feed roller 50 is driven by a dc motor. The speed of the motor is controlled by a closed-loop system which controls the armature voltage by thyristors. Potentiometer 60 provides the required trim. The potentiometer is actuated by dancing roller 52. This arrangement ensures that the fabric is at constant tension, and close to zero elongation in the case of stretch fabrics.

If rippling of the silicone rubber and therefore loss of friction is to be avoided it is essential that stretch fabrics are processed completely relaxed. Tension is adjusted by varying counterweight 80 in relation to dancing roller 52.

The fabric path is over the saddle 64 and this saddle can be stationary which produces a straight line extrusion, or the saddle can be made to transversely reciprocate or oscillate which results in a wavy pattern extrusion.

Situated above the saddle 64 is the jet manifold M as described with reference to FIG. 1. Jets 22 are set at about 0.010 of an inch from the fabric being processed. On/off valve 70 controls the fluid flow and is piped with nylon tubing to the filter trap 72 as described with reference to FIG. 2. Filter trap FT is connected with nylon tubing to pressure vessel 74 which is charged with silicone rubber. The pressure in the vessel is applied by nitrogen gas via pressure regulator 76. The size of the bead extruded can be finely controlled with the aid of regulator 76 and pressure gauge 78.

The following Examples further illustrate the invention:

EXAMPLE 1

Trouser Waistband

A mixture of polymer is prepared as follows:

| | |
|---|---|
| Silastic 732 (elongation 450%) | 45 parts |
| Silastic 734 (elongation 300%) | 45 parts |
| Trichoroethane | 10 parts |

This mixture will have an elongation of 375 percent, but a trouser waistband will normally only have an elongation of 10 percent. As stated the polymer must have an elongation of three times the base fabric. This mixture will therefore be satisfactory and will not crack.

The mixture so formed was fed to manifold M and through the filter and air trap FT. The manifold was fitted with jets 22 tapering 1 in 48 to an orifice diameter of 0.0625 inch.

The narrow fabric F is led below the jets 22 and two lines of extruded mixture is formed longitudinally thereon.

EXAMPLE 2

(Corsetry Leg Band)

The base fabric was a lace having an elongation of 150 percent. If cracking is to be prevented then the polymer must have an elongation of 150 × 3 = 450 percent. It can therefore be seen that the formulation as used in Example 1 cannot be used for this lace. Silastic 732 does have the required elongation but the viscosity is far too high. General Electric RTV 118 with an elongation of 450 percent and the correct viscosity is suitable. The lace was processed as in Example 1 but five lines of extruded mixture in a sine wave pattern formed by oscillating the jets.

RESUME

The products after curing has the smooth lines of translucent rubber firmly adhered to the fabric, capable of adapting to all deformations of the fabric without cracking or becoming separated therefrom and lace is not disfigured on the face by bleed through.

The adhesion of the silicone rubber to polyamides and polyester yarns, or fabrics made from such yarns, is superior to normal mechanical adhesions, suggesting that chemical adhesion occurs. This result becomes apparent only when the techniques of application revealed in this specification are strictly followed.

The gripper provided by the present invention providee an excellent trouser waistband. Trouser waistband grippers according to the invention are very much cheaper to produce than prior art structures which generally involved separate fabrication of a gripper which then had to be stitched into the trouser together with appropriate stiffening material. It will be seen from the foregoing description that the trouser waistband gripper according to the invention can be produced by direct application of the rubber to the fabric.

In addition to the production of trouser waistband grippers, the invention may be applied to produce grippers or stocking tops and stretch lace for lingerie in which latter connection the provision of a rubber backing is no longer required. The invention may also be applied to swimwear since the coefficient of friction of RTV silicone rubber is not reduced by water, and to elasticated support bandages.

What is claimed is:

1. A process for increasing the coefficient of friction of textile fabric comprising applying to at least part of said fabric, while in a substantially relaxed state, an inert room temperature vulcanising silicone rubber, said rubber having an elongation at least three times that of said fabric, and thereafter vulcanizing the rubber.

2. A process as claimed in claim 1, wherein the rubber is applied by spraying.

3. A process as claimed in claim 1, wherein the rubber is applied by extrusion.

4. A process as claimed in claim 1, wherein the rubber is filtered to remove lumps therefrom prior to application to the fabric.

5. A process as claimed in claim 1, wherein air bubbles are removed from the rubber prior to application to the fabric.

6. A process as claimed in claim 1, wherein the rubber is sheared before application to the fabric.

7. A process as claimed in claim 1, wherein the rubber is applied as one or more narrow lines on the fabric.

8. A textile fabric having at least a part thereof being coated with an inert, non-slump room temperature vulcanised silicone rubber, said rubber having an elongation at least three times that of said fabric.

9. A fabric as claimed in claim 8, wherein the fabric is elasticated.

10. A fabric as claimed in claim 8, wherein the coating is in the form of a plurality of spaced apart, parallel, narrow lines.

* * * * *